(12) United States Patent
McKonly et al.

(10) Patent No.: US 11,033,062 B2
(45) Date of Patent: Jun. 15, 2021

(54) SWEAT REMOVAL APPARATUS

(71) Applicant: Oakley, Inc., Foothill Ranch, CA (US)

(72) Inventors: Chad Michael McKonly, San Clemente, CA (US); Kevin K. Grant, Lake Forest, CA (US); Christopher Lee Greenwalt, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 96 days.

(21) Appl. No.: 16/182,096

(22) Filed: Nov. 6, 2018

(65) Prior Publication Data

US 2019/0133224 A1     May 9, 2019

Related U.S. Application Data

(60) Provisional application No. 62/582,612, filed on Nov. 7, 2017.

(51) Int. Cl.
*A41D 20/00* (2006.01)
*A42C 5/00* (2006.01)
(Continued)

(52) U.S. Cl.
CPC ............... *A41D 20/00* (2013.01); *A42B 1/22* (2013.01); *A42B 3/0406* (2013.01); *A42C 5/00* (2013.01);
(Continued)

(58) Field of Classification Search
CPC .. A42C 5/02; A42C 5/00; A41D 20/00; A41D 31/12
USPC .... 2/181, 181.2, 181.4, 181.6, 181.8, 182.1, 2/182.2, 182.3, 182.4, 182.5, 182.6, 2/182.7, 182.8, 183, DIG. 5
See application file for complete search history.

(56) References Cited

U.S. PATENT DOCUMENTS 1,366,890 A * 1/1921 Dehle ...................... A42B 7/00
                                                    2/181
4,368,545 A * 1/1983 Seidman ................ A45D 44/12
                                                    2/174
(Continued)

FOREIGN PATENT DOCUMENTS

WO  WO 2011/046988 A2   4/2011
WO  WO 2013/055787 A1   4/2013
WO  WO 2016/205757 A1   12/2016

OTHER PUBLICATIONS

"Bluegrass Golden Eyes Helmet 2017 | Chain Reaction Cycles," printed Nov. 6, 2018 from Google's cache of https://www.chainreactioncycles.com/bluegrass-golden-eyes-helmet-2017/rp-prod155281, 4 pages, Nov. 4, 2018.
(Continued)

*Primary Examiner* — Alissa L Hoey
*Assistant Examiner* — Patrick J. Lynch
(74) *Attorney, Agent, or Firm* — Sterne, Kessler, Goldstein & Fox P.L.L.C.

(57) ABSTRACT

An apparatus is described to divert sweat away from a wearer's eyes or eyewear. The apparatus includes an elongate base member and a plurality of pliable ridges abutting the base member that, when pressed against the wearer's forehead, form channels. The channels collect and divert sweat away from the eyes so that the sweat drips down the side or back of the head, or down the nose, instead of flowing into the eyes or onto eyewear worn by the wearer.

17 Claims, 11 Drawing Sheets

(51) Int. Cl.
*G02C 11/00* (2006.01)
*A42B 1/22* (2006.01)
*A42B 3/04* (2006.01)
*A41D 31/12* (2019.01)
*A42B 3/06* (2006.01)

(52) U.S. Cl.
CPC ............. *G02C 11/00* (2013.01); *A41D 31/12* (2019.02); *A42B 3/066* (2013.01)

(56) References Cited

U.S. PATENT DOCUMENTS

| | | | |
|---|---|---|---|
| 4,626,247 A | 12/1986 | Frankel | |
| 4,630,317 A * | 12/1986 | Brown | A41D 20/00 |
| | | | 2/12 |
| 4,638,512 A | 1/1987 | Frankel | |
| 4,993,079 A * | 2/1991 | Johnson | A42B 7/00 |
| | | | 2/181 |
| 5,551,094 A * | 9/1996 | Navone | A42B 3/08 |
| | | | 2/418 |
| 6,353,936 B2 | 3/2002 | Flatt | |
| 6,567,991 B1 | 5/2003 | Holslag et al. | |
| 6,584,984 B2 * | 7/2003 | Kelly | A45D 8/36 |
| | | | 132/212 |
| 7,398,559 B2 | 7/2008 | Flatt | |
| 7,681,252 B1 | 3/2010 | Petry | |
| 7,954,204 B2 | 6/2011 | Hammerslag et al. | |
| 8,296,866 B2 | 10/2012 | Kelly | |
| 9,009,869 B1 | 4/2015 | Shapiro et al. | |
| 10,076,150 B1 * | 9/2018 | Flatt | A42C 5/02 |
| 2009/0077716 A1 | 3/2009 | Farney | |
| 2009/0241240 A1 * | 10/2009 | Han | A42C 5/02 |
| | | | 2/182.8 |
| 2013/0247281 A1 * | 9/2013 | Zebouni | A42C 5/02 |
| | | | 2/272 |
| 2014/0289932 A1 * | 10/2014 | Shapiro | A42C 5/02 |
| | | | 2/181 |
| 2015/0059066 A1 * | 3/2015 | Ketterer | A42B 3/14 |
| | | | 2/418 |
| 2015/0208742 A1 * | 7/2015 | Shapiro | A41D 31/00 |
| | | | 2/171 |
| 2016/0366960 A1 | 12/2016 | Shipman et al. | |

OTHER PUBLICATIONS

"LUPO—Met Helmets," printed Nov. 2, 2018, from https://www.met-helmets.com/products/mtb/lupo, 3 pages, Copyright 2018.
Stöckl, M., "The Review | MET Parabellum HES Helmet," printed Nov. 2, 2018 from https://enduro-mtb.com/en/test-review-met-parabellum-hes/, 9 pages, Jun. 26, 2015.
"S-Works Prevail II | Specialized.com," printed Nov. 6, 2018 from https://www.specialized.com/us/en/s-works-prevail-ii/p/117201, 3 pages, Copyright 2018.
European Search Report and Written Opinion, dated Mar. 27, 2019 in Related EP Patent Application No. 18204638.3; 8 pages.

* cited by examiner

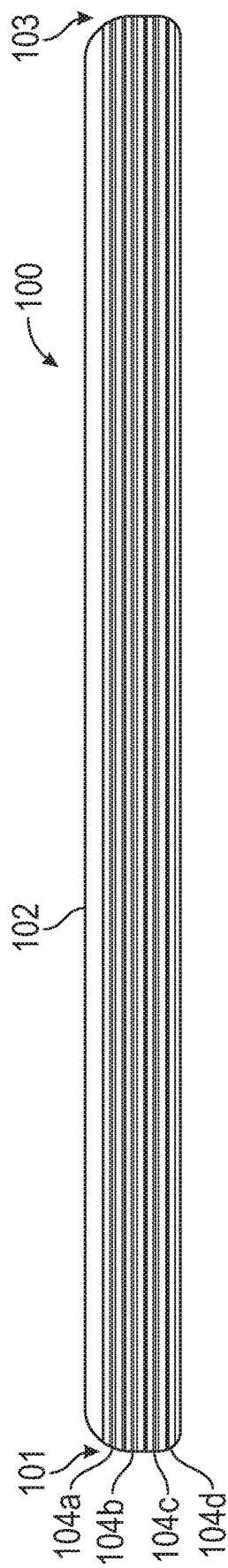
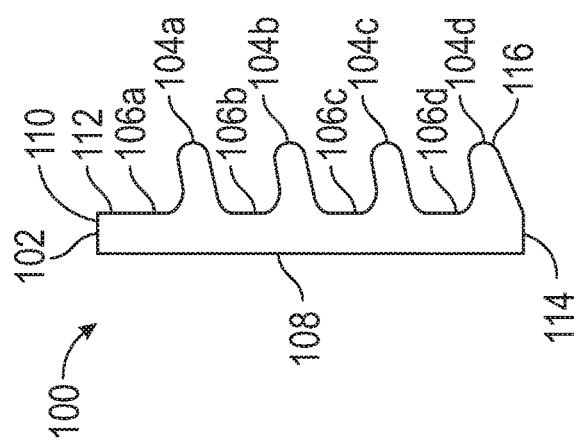
FIG. 1A
FIG. 1B

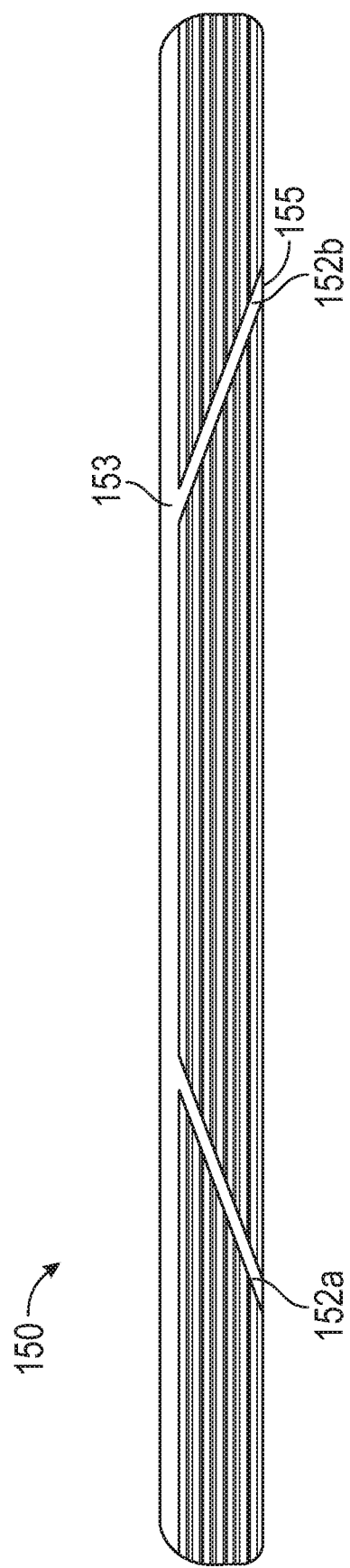

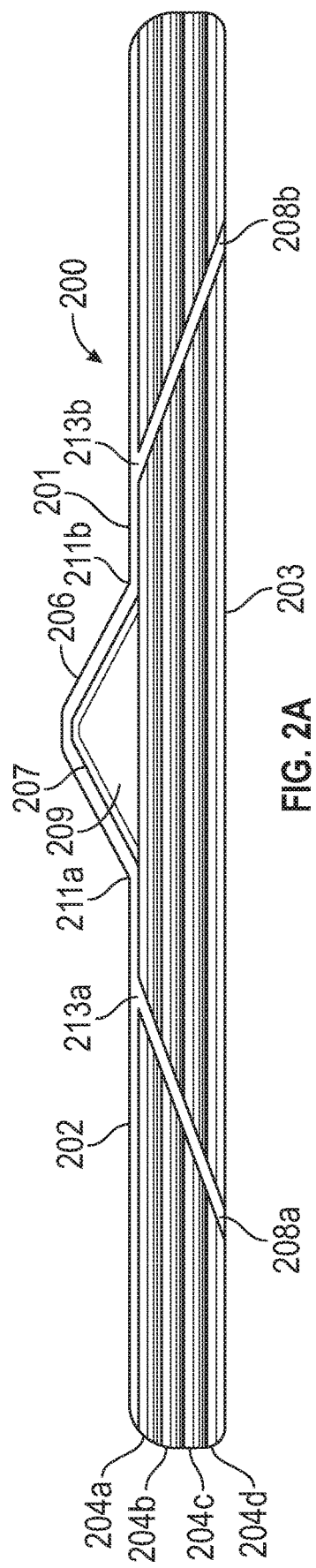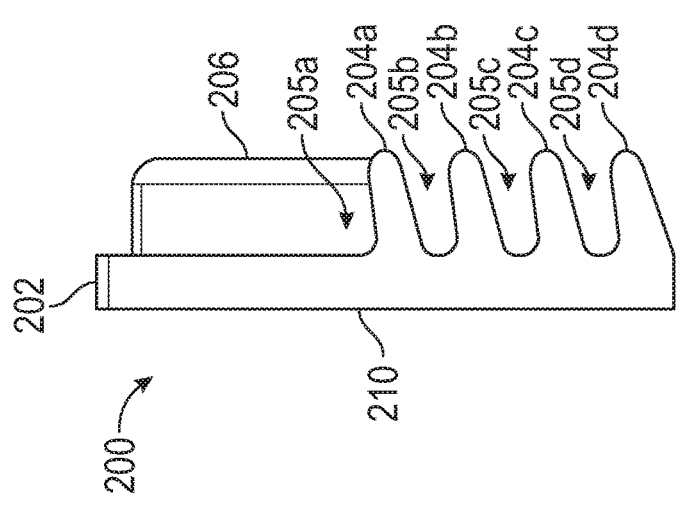
FIG. 2A
FIG. 2B

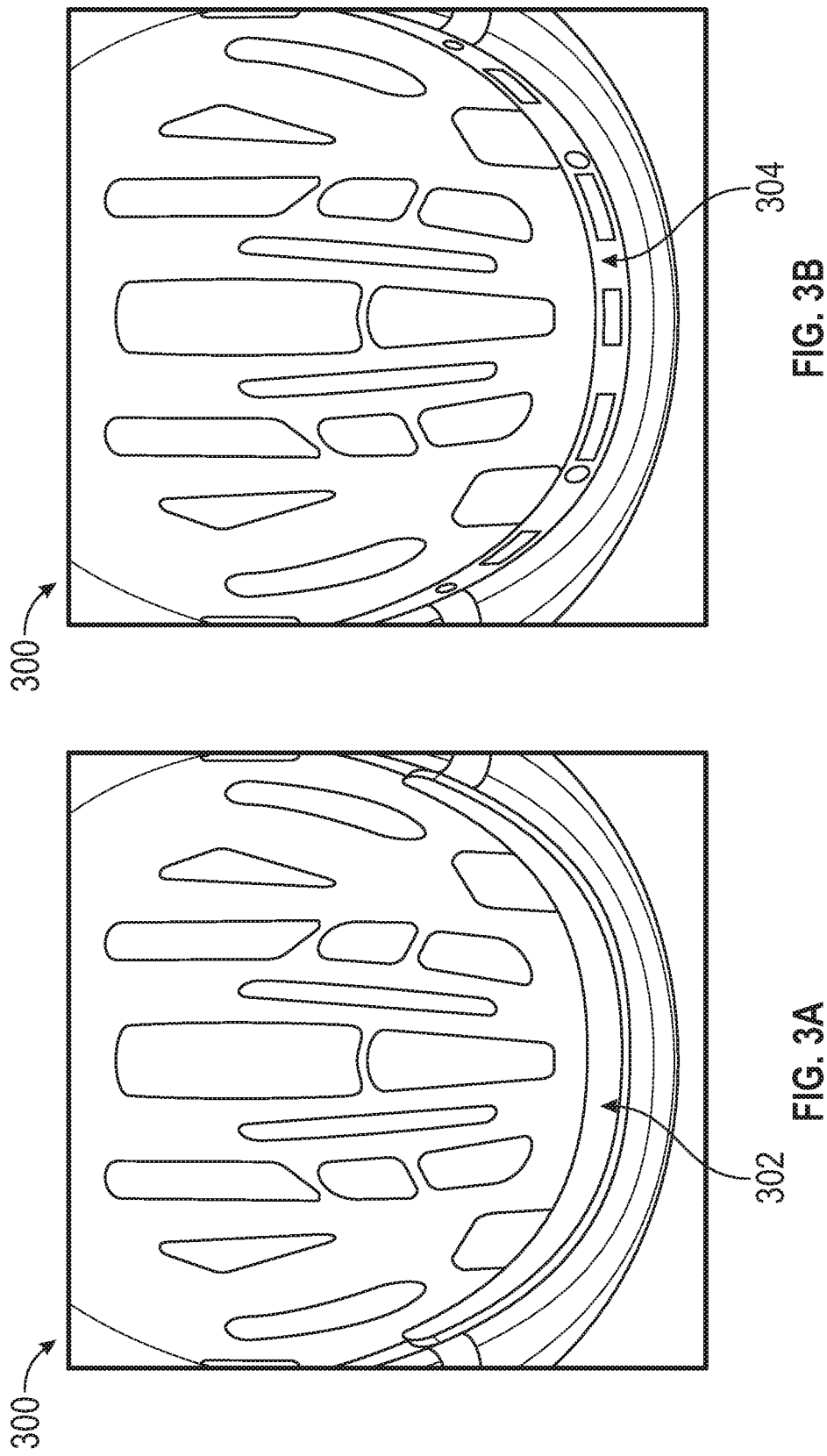

SWEAT REMOVAL APPARATUS

CROSS REFERENCE TO RELATED APPLICATIONS

This application claims the benefit of U.S. Provisional Appl. No. 62/582,612, filed Nov. 7, 2017, which is incorporated by reference herein in its entirety.

BACKGROUND

Field

Embodiments of the present invention generally relate to an apparatus for diverting sweat away from a user's eyes.

Background

When undertaking physical exercise, a person often perspires, producing sweat along the forehead which can eventually drip into the person's eyes. Sweat can cause a stinging sensation in the eyes and can hamper vision. This problem is particularly problematic when a person is cycling, as his or her hands are usually holding the handlebars such that the sweat cannot be easily wiped away. Further, cyclists often wear helmets which can trap heat, further provoking a sweat response. If the cyclist is wearing eyewear, such as sunglasses or protective eyewear, the tendency of the cyclist to incline his or her head downward can cause the sweat to drip onto the eyewear, interfering with the cyclist's vision.

Over the years, apparatuses such as sweatbands have been created to help absorb the sweat. Such apparatuses are typically created from an absorbent material, and only last a short while until they become over-saturated and fail. Other types of sweat-control apparatuses have been made from rigid materials, which create pressure and discomfort when worn for an extended period of time.

SUMMARY

Embodiments are described herein for an apparatus configured to divert sweat away from a wearer's eyes. Such an apparatus, when pressed against a wearer's forehead, forms one or more channels that collect sweat and divert it away from the eyes.

In an embodiment, the sweat removal apparatus includes an elongate base member having a front surface and a back surface opposite the front surface. A plurality of pliable ridges abuts the back surface of the base member and protrudes outwardly therefrom. The plurality of pliable ridges extends along a length of the back surface of the elongate base member. When pressed against a wearer's head, a channel is formed by each ridge between the back surface of the elongate base member and the skin of the wearer's head. The channels serve to divert sweat away from the wearer's eye region.

The plurality of ridges are formed of a pliable material so that the sweat removal apparatus conforms to the wearer's head. In an embodiment, the elongate base member and the plurality of ridges are formed from the same pliable material as one monolithic apparatus. In another embodiment, the base member and the plurality of ridges are formed separately from different materials having different levels of pliability.

In an embodiment, each channel has an opening at a location that would be behind a wearer's eyes when worn, such as on the side of the face, near the ears, or at the back of the head. In another embodiment, each channel has an opening at a location of the apparatus that would be between a wearer's eyes when worn, such that sweat would drip down the wearer's nose rather than over the eyes or onto a wearer's eyewear lenses.

The front or outer surface of the base member may be configured so that the sweat removal apparatus can be integrated into or attached to an item of headwear, such as a bicycle, skateboarding, snow or other type of helmet, a visor, a hat, eye protection (such as goggles, glasses, sunglasses, eyewear with a single lens (e.g., a unitary lens), eyewear with dual lenses, eyewear with partial orbitals, eyewear without orbitals, eyewear with earstems, eyewear with partial earstems, eyewear without earstems, and the like), a headband, or any other item that a person would wear on the head or over the eyes. In an embodiment, the sweat removal apparatus is removable from the headwear, so that the apparatus can be removed or replaced without damaging the headwear. In another embodiment, the outer surface of the base member is coated with a permanent or semi-permanent adhesive for permanent or semi-permanent installation in the headwear. In an embodiment, the sweat removal apparatus may be configured to magnetically couple to a magnetic receiving system in the headwear. In an embodiment, the sweat removal apparatus can be integrated into or attached to a fit system in the headwear.

In an embodiment, the ridges are coated with a hydrophobic material to help prevent the apparatus from absorbing sweat, and to speed the flow of sweat along the channels. In another embodiment, the ridges are coated with a hydrophilic material to encourage the sweat to spread out along the channels or to hold the sweat in the channels.

In another embodiment, the sweat removal apparatus also includes at least one cross channel that extends across at least one of the ridges at an angle relative to the length of the ridges. For example, the channel may extend away from a top edge of the base member towards an end region of the base member. In an embodiment, the sweat removal apparatus includes a plurality of cross channels.

In yet another embodiment, the base member further includes one or more protrusions located along the top edge above a central region of the base member to aid in diverting sweat through the cross channels when the user inclines his or her head downwards.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the present invention are described with reference to the accompanying drawings. In the drawings, like reference numbers indicate identical or functionally similar elements. Additionally, the left most digit(s) of a reference number identifies the drawing in which the reference number first appears.

FIGS. 1A-1B illustrate different views of an example sweat removal apparatus, according to an embodiment.

FIG. 1C illustrates another embodiment of a sweat removal apparatus.

FIGS. 2A-2B illustrate different views of another embodiment of a sweat removal apparatus.

FIGS. 3A-3B illustrate an example of where an example sweat removal apparatus would be installed in an item of headwear.

DETAILED DESCRIPTION

Figure 4:
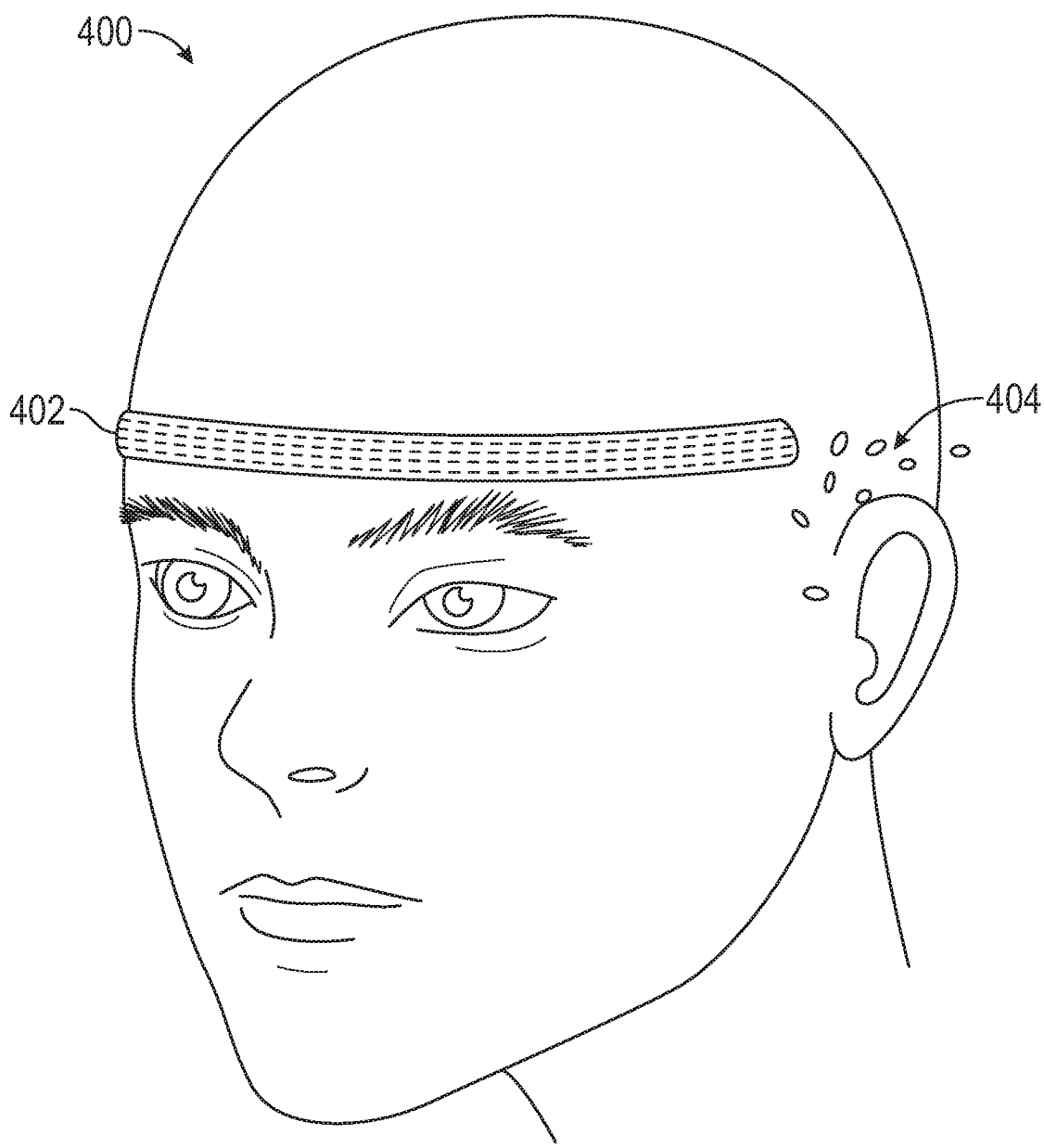
FIG. 4 illustrates placement of a sweat removal apparatus along a wearer's forehead, according to an embodiment.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

FIGS. 1A-1B illustrate an example embodiment of the present invention. FIG. 1A depicts a horizontal view of an interior of sweat removal apparatus 100. An elongate base member 102 forms the base of sweat removal apparatus 100. Elongate base member 102 includes a front surface (not shown) and a back surface (shown) opposite the front surface. When worn against the forehead of a wearer, the front surface of elongate base member 102 faces away from the wearer's forehead, while the back surface of elongate base member 102 faces towards the wearer's forehead. Extending along and abutting the back surface of base member 102, a plurality of pliable ridges 104a-104d protrude outward from the base member towards the wearer's head. In the embodiment of FIGS. 1A and 1B, four ridges are shown; however, any number of ridges can be used.

Ridges 104a-104d are formed from a non-absorbent pliable material, such as silicone, a rubberized material, soft plastic, or a closed-cell foam. Because the ridges are non-absorbent, the ridges will form a tight seal when pressed against the wearer's forehead, and the gaps between each ridge form channels (106a-106d in FIG. 1B). At the same time, because the ridges are pliable, the ridges will flex against and adapt to the shape of the wearer's head. In this way, the ridges do not create undue pressure that would cause discomfort when worn for an extended period of time.

FIG. 1B depicts a cross-sectional side view of sweat removal apparatus 100. The left side of elongate base member 102 in FIG. 1B, represented by front surface 108, faces away from the wearer's head. The right side of elongate base member 102 in FIG. 1B faces towards the wearer's head. As shown, the plurality of ridges 104a-104d protrude from the back surface 112 of elongate base member 102. In an embodiment, the plurality of ridges 104a-104d protrude perpendicularly from the back surface 112 of elongate base member 102. In an embodiment, the ridges may protrude, for example, to approximately 1.5 mm from the back surface 112 of elongate base member 102, though other lengths may also be selected depending on the material and application. In another embodiment, the plurality of ridges 104a-104d protrude at a slight angle, as shown. In still another embodiment, the plurality of ridges 104a-104d curve outward from the back surface 112 of elongate base member 102. One of skill in the art will recognize that the plurality of ridges 104a-104d may take any of a variety of shapes that result in a seal when pressed against the skin of a wearer.

As discussed above, the plurality of ridges are formed of a pliable material so that the sweat removal apparatus conforms to the wearer's head. In an embodiment, the elongate base member 102 and the plurality of ridges 104a-104d are formed from the same material as one monolithic apparatus. In another embodiment, the elongate base member 102 and the plurality of ridges 104a-104d are formed separately from different materials having different durometers (that is, levels of pliability). For example, the elongate base member 102 may be more rigid than the plurality of ridges 104a-104d. In an embodiment, the ends of the elongate base member 102 may be more absorbent to help wick sweat out of the channels.

When a wearer begins to sweat, beads of sweat tend to roll down the wearer's forehead towards the eyes. Sweat removal apparatus 100 is sized such that it extends at least across a wearer's eyes. As can be seen in FIG. 1B, the top ridge, ridge 104a, will form an open channel 106a when pressed against a wearer's forehead. In this way, channel 106a catches sweat originating above ridge 104a. Each of channels 106b-106d is sealed when pressed against a forehead of a wearer, such that it catches sweat originating between its bounding ridges.

When sweat removal apparatus 100 is pressed against a wearer's forehead, channels 106a-106d are curved. When the wearer's head is held up, such as when a cyclist is looking down a mountain bike trail, such curvature encourages sweat captured in channels 106a-106d to flow from a central portion of the apparatus toward the ends of the apparatus. Openings in the channels can empty the sweat from the channels at locations that would be away from a wearer's eyes when worn.

While embodiments herein are described with respect to diverting sweat away from the eyes or eyewear of a wearer, the embodiments described herein would also be effective in diverting rain, water, or other liquids that may be problematic.

In an embodiment, each channel has an opening at a location that would be behind a wearer's eyes when worn, such as on the side of the face, near the ears, or at the back of the head. This causes forehead sweat to pool in the channels and be diverted to or empty out at some other location on the wearer's head such that it does not affect the eyes or drip onto the wearer's eyewear lenses. For example, the openings may be located at the ends of the channels. In another example, the openings are located between the ends of the channels and a location that would be behind the wearer's eyes when worn.

It is possible that, depending on the elasticity and tautness of a wearer's skin, at least one channel may be filled by the wearer's skin such that sweat cannot flow through the channel. However, as long as at least one channel is sufficiently free of obstructions such that sweat is allowed to flow, then the sweat removal apparatus will be operative to collect and divert sweat, providing relief to the wearer.

The elongate base member and the plurality of ridges may be of appropriate size and thickness to cover enough of a wearer's forehead to be effective. For example, a thickness of elongate base member 102 from front surface 108 to back surface 112 is approximately 1.5 mm, though its thickness may be more or less as the application and materials require. An example length of each of the ridges 104a-104d may also be approximately 1.5 mm, as measured from the back surface 112 to the tip of the ridge (116, for example), though their lengths may be more or less as the application and materials require. An example width of each of the ridges 104a-104d (shown vertically in FIG. 1B) may also be approximately 1.5 mm, though it may be smaller or larger as the application and materials require. In an embodiment, the width of each of the ridges 104a-104d tapers such that it is thicker where it abuts elongate base member 102, and thinner at the ridge tip 116. In an embodiment, each of the ridges 104a-104 are equally sized. In another embodiment, the ridges 104a-104d may be sized differently from each other. An example height of elongate base member 102 (i.e., the distance from top edge 102 to bottom edge 114) may be approximately 9 mm, though it may be smaller or larger as the application and materials require. While the embodiment of FIGS. 1A and 1B show four ridges in the plurality of ridges, one of skill in the art would recognize that there may be more or fewer ridges to suit the application and preferred size of the sweat removal apparatus.

In an embodiment, sweat removal apparatus 100 is sized to wrap around the wearer's forehead when worn so that the channels empty the sweat out behind the wearer's eyes, along the side of the wearer's face. Referring back to FIG. 1A, an example length of elongate base member 102 in such a configuration may be approximately 23 cm from end 101 to opposing end 103, for a sweat removal apparatus designed to fit a head circumference of 50-60 cm. One of skill in the art will recognize that the horizontal length of base member 102 may be smaller or larger as the application and materials require, and may be sized differently depending on a head size of the intended wearer. In another embodiment, sweat removal apparatus 100 is sized so that the channels empty the sweat out behind the ears. In yet another embodiment, sweat removal apparatus 100 is sized so that the channels empty the sweat out near the back of the head. In order for the sweat removal apparatus to effectively empty the sweat from the channels, in this embodiment the ends of the sweat removal apparatus still remain separate from each other such that the sweat removal apparatus does not completely encircle the wearer's head.

FIG. 4 illustrates placement of a sweat removal apparatus 402 along the forehead of a wearer 400. Sweat removal apparatus 402 may be similar to sweat removal apparatus 100, or to any of the sweat removal apparatuses described further below. Sweat removal apparatus 402 extends across the forehead as shown, ending at either side at a point past the eyes and before the ears. In another embodiment, sweat removal apparatus 402 ends at a point over or past the ears toward the back of the head, but does not completely encircle the head. In the illustration of FIG. 4, the channel outlets are located at the ends of the channels, such that while in use the sweat 404 flows out from the channel exits at the ends of sweat removal apparatus 402.

Figure 5:
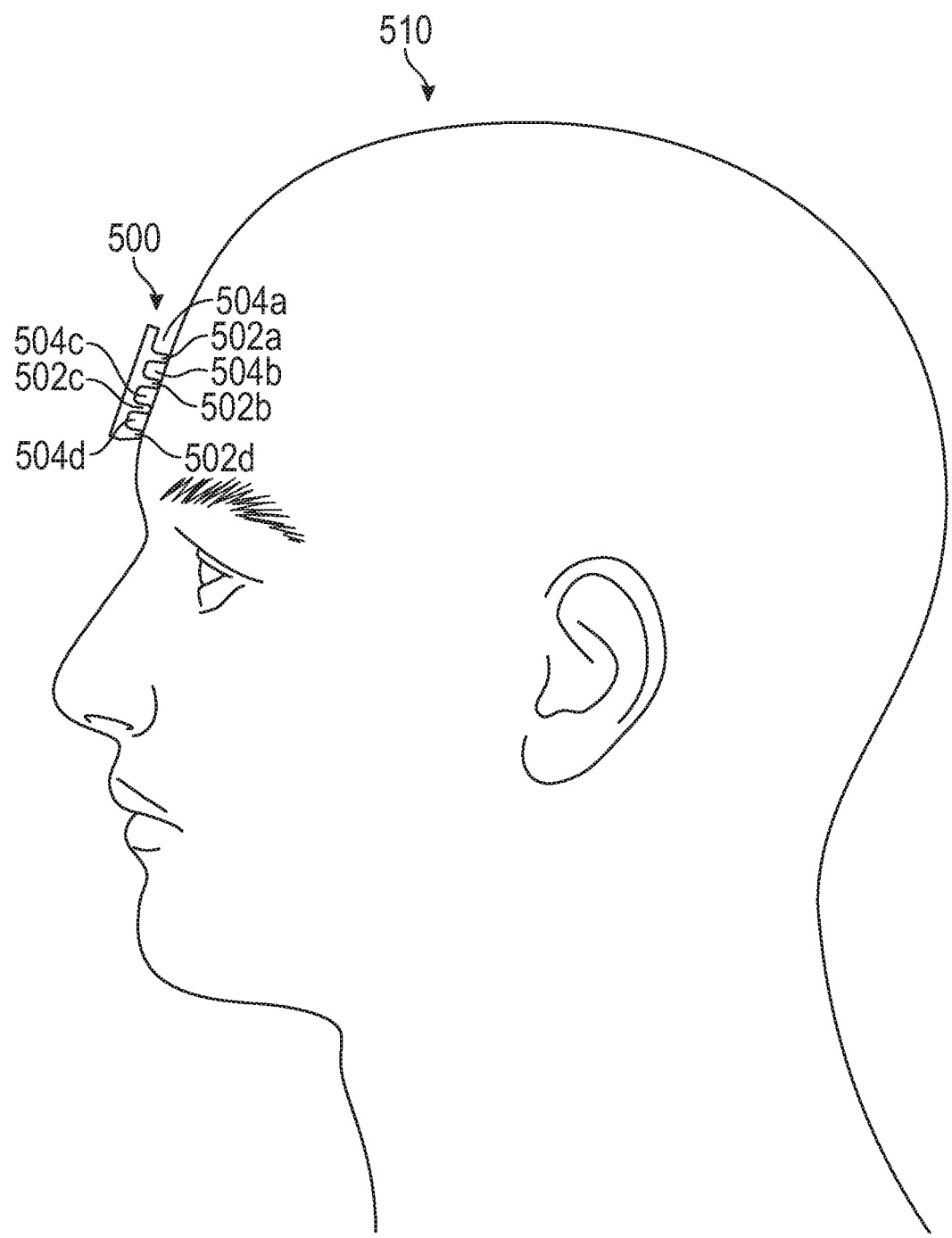
FIG. 5 illustrates a cross sectional view of a sweat removal apparatus pressed along a wearer's forehead, according to an embodiment.
Figure 6A:
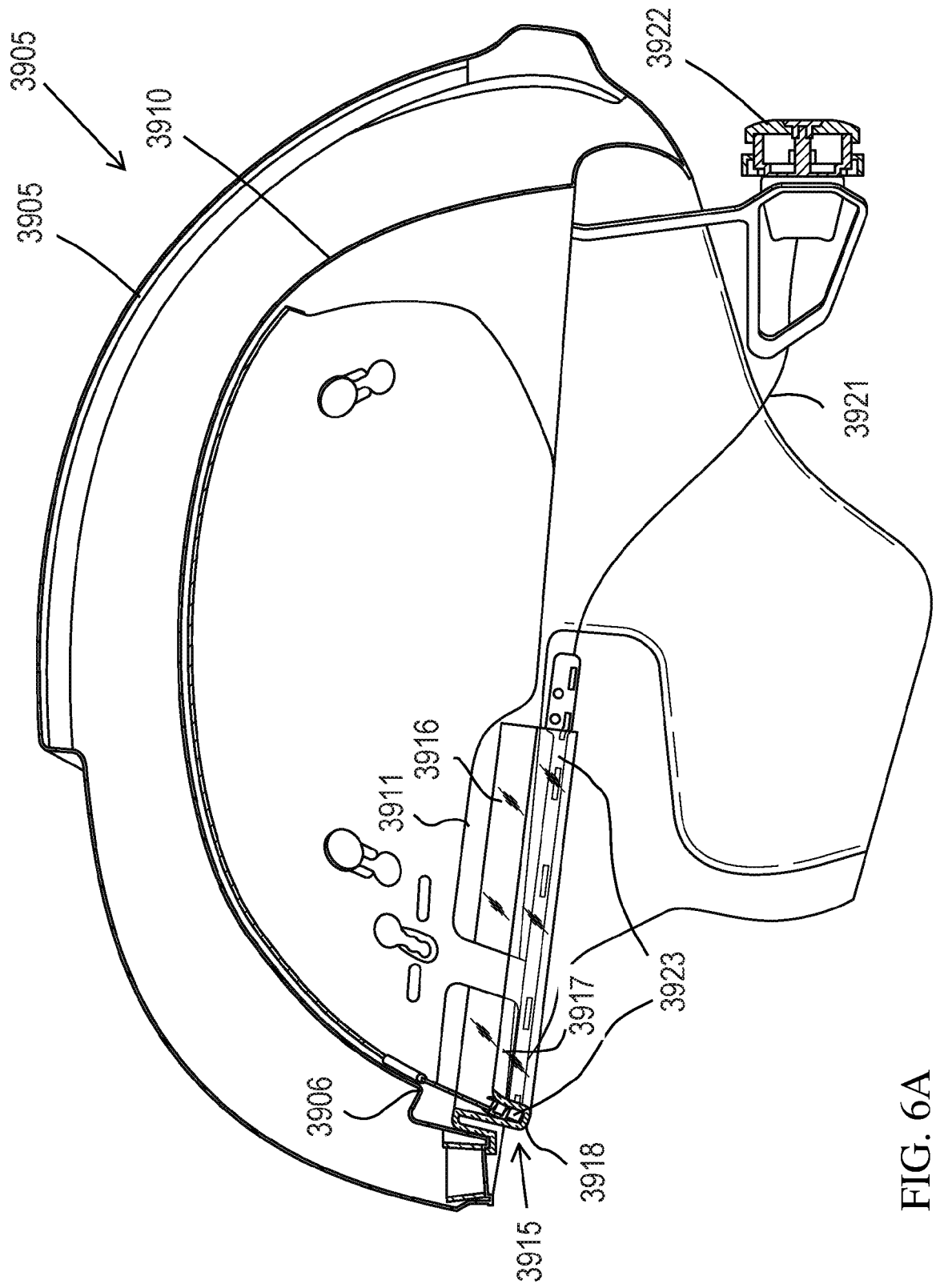
FIGS. 6A-6D illustrate a helmet having an example sweat removal apparatus for capturing and directing sweat and other liquids away from a face of a wearer, according to an embodiment.
Figure 6B:
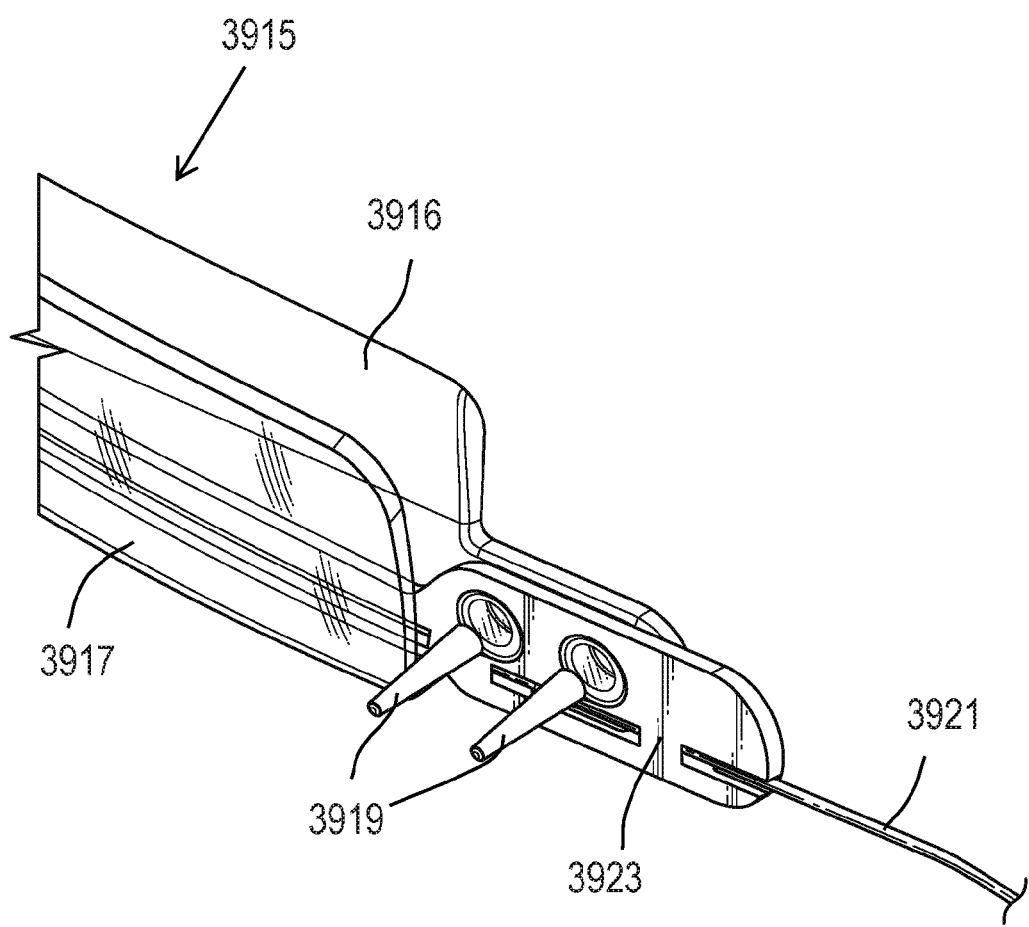
Figure 6C:
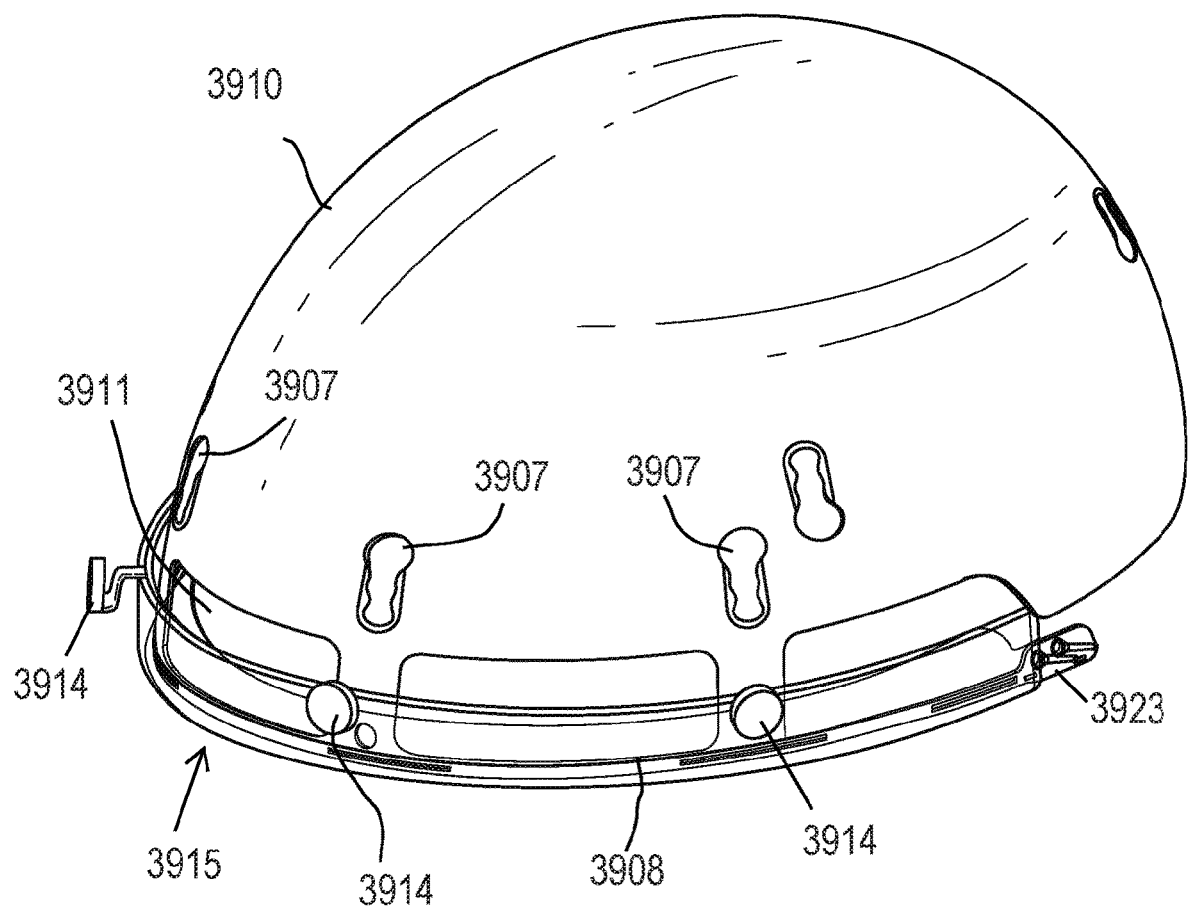
Figure 6D:
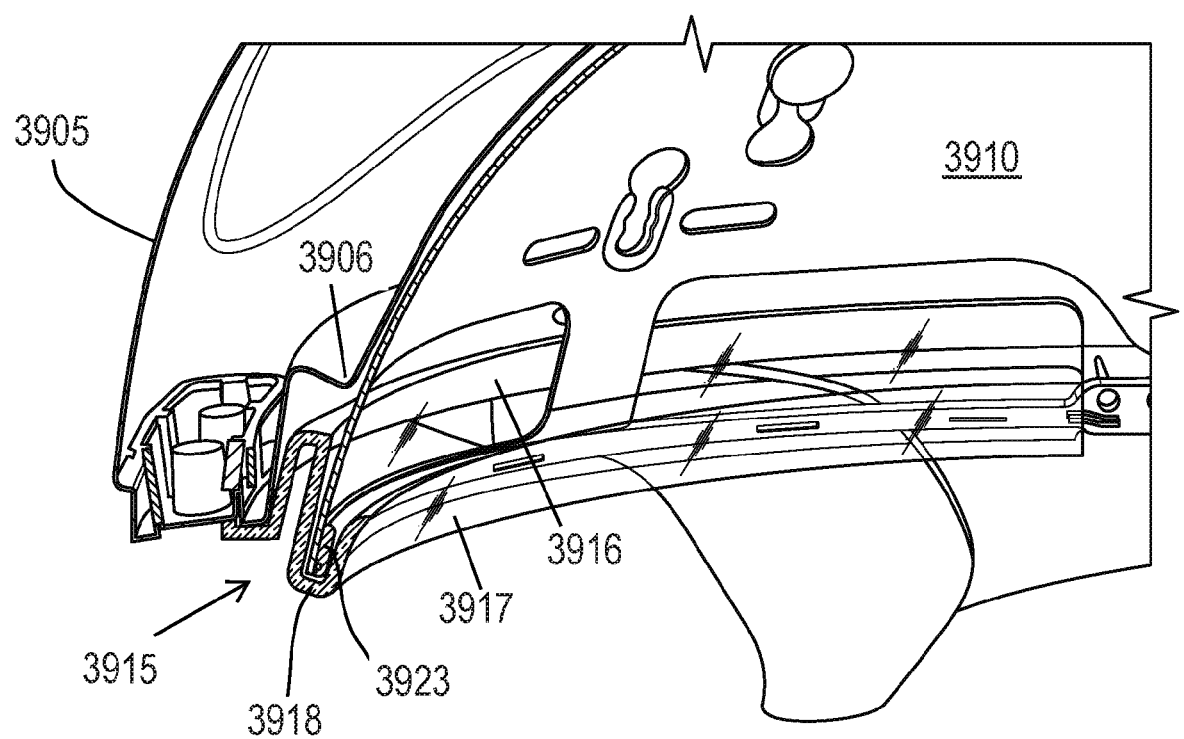

FIG. 5 illustrates a cross sectional view of a sweat removal apparatus 500 pressed along the forehead of wearer 510. Sweat removal apparatus 502 may be similar to sweat removal apparatus 100, or to any of the sweat removal apparatuses described further below. Shown here is how the plurality of ridges 502a-502d press against the forehead, forming channels 504a-504d for the sweat to flow through.

Returning to FIGS. 1A and 1B, instead of having channel openings at locations that would be behind the wearer's eyes when worn, in an embodiment each channel 106a-106d has an opening at a location of sweat removal apparatus 100 that would be between a wearer's eyes when worn, such that sweat would drip down the wearer's nose rather than over the eyes or onto a wearer's eyewear lenses.

One or more of the plurality of ridges 104a-104d and the back surface of elongate base member 102 (including the wall of channels 106a-106d) may be coated with a material that facilitates movement of collected sweat through channels 106a-106d. For example, such a coating material may be a hydrophobic material to help prevent the apparatus from absorbing sweat, and to ease the flow of sweat along the channels. In another embodiment, the ridges are coated with a hydrophilic material to encourage the sweat to spread out along the channels.

When cycling on an open road or a straight course, cyclists often lower their heads to a face down position. This head-down position has the unfortunate side effect of gravity causing the sweat to pool at the center of sweat removal apparatus. Because channel 106a in the embodiment of FIGS. 1A and 1B is open, sweat may eventually pool to an amount that fills channel 106a and spills over the top edge of elongate base member 102. This may result in sweat flowing into a wearer's eyes or dripping onto eyewear worn by a wearer, reducing the effectiveness of sweat removal apparatus 100. To avoid such pooling of sweat in channel 106a when a wearer angles his or her head downward, one or more cross channels may be placed to transfer sweat from open channel 106a into one or more of closed channels 106b-106d. FIG. 1C depicts an embodiment of sweat removal apparatus 150 having cross channels 152a and 152b. As shown, sweat removal apparatus 150 is similar to sweat removal apparatus 100 of FIGS. 1A-1B. However, sweat removal apparatus 150 also contains cross channels 152a and 152b. When worn in a face down position, cross channels 152a and 152b would be substantially horizontal to the ground, and would allow the sweat to divert from the top channel toward the bottom channels. Cross channels 152a and 152b need not cross all ridges 104a-104d. In an embodiment, cross channels 152a and 152b merely cut across ridge 104a, such that an opening is formed between open channel 106a and closed channel 106b. This allows sweat in channel 106a to be diverted into channel 106b. In another embodiment, cross channels 152a and 152b cut across multiple ridges, but do not cross the bottom ridge (shown in FIGS. 1A and 1B as ridge 104d). In yet another embodiment, cross channels 152a and 152b cut across all the ridges 104a-104d, as shown having ends 153 and 155, causing sweat that would otherwise pool in channel 106a when the wearer's head is angled downwards to be diverted away from the eyes and exit at end 155 of channel 152a. Although two cross channels are shown in FIG. 1C, one of skill in the art will recognize that there may be one or more cross channels on each side of the central region of sweat removal apparatus 150. In another embodiment, sweat removal apparatus 150 has only one cross channel altogether. While cross channels 152a and 152b are illustrated as diverting sweat from a central region of sweat removal apparatus 150 to an area that would be located to the side of the wearer's eyes when worn, one or more cross channels 152a and 152b may alternatively have a direction that diverts the collected sweat in a "V" shape such that it is output down the bridge of the wearer's nose. In another embodiment, sweat removal apparatus 150 may have a combination of cross channels, with one or more cross channels diverting sweat down the bridge of the wearer's nose, and an additional one or more cross channels diverting sweat down the side of the face or behind the ears.

FIGS. 2A-2B illustrate another embodiment of the present invention that further assists to mitigate the sweat-pooling effects when the wearer inclines his or her head downward. FIG. 2A depicts a horizontal view of an interior of sweat removal apparatus 200. An elongate base member 202 forms the base of sweat removal apparatus 200. A plurality of pliable ridges 204a-204d protrude outward from elongate base member 202 towards the wearer's head. When pressed against the wearer's forehead, the ridges will form a tight seal, and the gaps between each ridge form channels (205a-205d in FIG. 2B). In FIGS. 2A-2B, elongate base member 202 shares the same features as elongate base member 102, plurality of pliable ridges 204a-204d share the same features as plurality of pliable ridges 104a-104d, and channels 205a-205d share the same features as channels 106a-106d.

Sweat removal apparatus 200 also comprises a protrusion 206 located along the top surface 201 of elongate base member 202. Protrusion 206 serves to divert sweat dripping down the forehead of a wearer away from the center of elongate base member 202. In an embodiment, protrusion 206 is centrally located with respect to elongate base member 202, but it can also be located off center. While protrusion 206 is illustrated in FIG. 2A as being generally triangular in shape, one of skill in the art will recognize that other protrusion shapes may be similarly effective. For example, protrusion 206 may instead be rounded, hemispherical, completely pointed with linear sides, rounded near the top with linear sides, or have another similarly protruding shape that diverts sweat prior to reaching plurality of ridges 204a-204d. In an embodiment, protrusion 206 diverts sweat towards cross channels 208a and 208b. However, protrusion 206 may be used with elongate base member 202 and plurality of ridges 204a-204d without the existence of cross channels 208a and 208b.

In an embodiment, protrusion 206 is a solid protrusion having a pliable ridge 207 that follows a perimeter of protrusion 206. In another embodiment, an interior 209 of protrusion 206 between its pliable ridge 207 and ridge 204a is open. Such a pliable ridge 207 at or near the perimeter of protrusion 206 serves to capture sweat from the forehead when worn, and redirect the sweat down towards channel 205a. For example, the pliable ridge 207 at or near the perimeter of protrusion 206 may create an extension of channel 205a when pressed against the wearer's forehead.

In the embodiment shown in FIG. 2A, the cross channels 208a-208b are located laterally offset from protrusion 206 and extend through the plurality of ridges 204a-204d, emptying at the bottom 203 of sweat removal apparatus 200. Cross channels 208a-208b empty at the bottom 203 of the sweat removal apparatus at points to the side of the face, away from the eyes. As discussed above with respect to FIG. 1C, cross channels 208a and 208b may also terminate prior to reaching the bottom 203 of sweat removal apparatus 200. Though FIG. 2A illustrates the edges 211a and 211b of protrusion 206 reaching ridge 204a closer to the center of the sweat removal apparatus than the entry points 213a and 213b to channels 208a and 208b, one of skill in the art will recognize that the location of the edges 211a and 211b of protrusion 206 abutting the top surface 201 of elongated base member 202 can be placed wider, such that the edges 211a and 211b of protrusion 206 meet the entry points 213a and 213b to channels 208a and 208b, or that the entry points 213a and 213b to channels 208a and 208b can be placed closer to the edges 211a and 211b of protrusion 206 than shown.

In an embodiment, the sweat removal apparatus 200 includes multiple protrusions along the top surface of elongate base member 202. For example, sweat removal apparatus 200 may include two protrusions along the top surface of elongated base member 202, each protrusion located above a portion of elongate base member 202 that would be above a wearer's eyes when worn.

FIG. 2B depicts a cross-sectional side view of the sweat removal apparatus 200. Again, the left side of elongate base member 202 is the outer edge (front surface 210) of sweat removal apparatus 200.

A sweat removal apparatus according to embodiments of the present invention, such as apparatuses 100, 150, and 200, may be configured to be attached to an item of headwear, such as a bicycle, skateboarding, snow or other type of helmet, a visor, a hat, eye protection (such as goggles, glasses, sunglasses, eyewear with a single lens (e.g., a unitary lens), eyewear with dual lenses, eyewear with partial orbitals, eyewear without orbitals, eyewear with earstems, eyewear with partial earstems, eyewear without earstems, and the like), a headband, or any other item that a person would wear on the head or over the eyes. For example, a sweat removal apparatus according to an embodiment described herein may replace a typical brow pad found in many helmets. FIGS. 3A-3B illustrate an interior of a helmet 300. In FIG. 3A, a sweat removal apparatus 302 is installed in helmet 300 as shown. Sweat removal apparatus 302 may be the same as sweat removal apparatus 100, 150, or 200. FIG. 3B shows an interior surface 304 of helmet 300 where sweat removal apparatus 302 would be installed. The means of attaching the sweat removal apparatus may be such that the sweat removal apparatus becomes removable, semi-permanent, or permanent.

For example, the attachment mechanism may include a hook-and-loop strip located on the front surface of sweat removal apparatus 302 that connects to another hook-and-loop strip that is affixed to an interior surface of the headwear. Velcro™ is an example of a hook-and-loop attachment mechanism, although similar mechanisms, such as hook-and-hook mechanisms, may also be used. In another example, the front surface may contain protrusions or buttons that snap into receivers (or vice versa) that are mounted into the interior of the headwear, such as a fit system incorporated into the headwear (such as described with respect to FIGS. 6A-6D below). In these variations, the sweat removal apparatus is removable from the headwear, so that the apparatus can be removed or replaced.

In another variation, the front surface may be coated with a permanent or semi-permanent adhesive for permanent or semi-permanent installation in the headwear. Physical fasteners, such as small screws or clamps, may also be used to install the sweat removal apparatus onto the headwear, though such fasteners would need to be of a small enough size as not to disrupt the sweat-diverting function of ridges 104a-104d/204a-204d or channels 106a-106d/206a-206d.

In an embodiment, the front surface of the elongate base member is not smooth, but is instead custom molded to match the contours and/or openings of helmet 300's interior surface 304. In this manner, a specific sweat removal apparatus can be customized to securely fit and/or become integral with a particular helmet.

In another embodiment, helmet 300 is configured so that different embodiments of sweat removal apparatuses can be interchanged in the helmet.

Further detail regarding helmet 300 and the combination of helmet 300 and a sweat removal apparatus according to an embodiment of the present invention is illustrated in FIGS. 6A-6D. While FIGS. 6A-6D are described with respect to a specific embodiment of a sweat removal apparatus having a single ridge with a "J" shape, one of skill in the art will recognize that other embodiments of the sweat removal apparatus, such as apparatuses 100, 150, and 200, may be similarly implemented in combination with such a helmet.

FIGS. 6A-6D illustrate a helmet 3900 having a sweat removal apparatus 3915 for capturing and directing sweat or water or any other liquids away from a face of a wearer. The sweat removal apparatus may be, for example, an embodiment of the sweat removal apparatus described above, such as apparatus 100, 150, 200, or an apparatus having a similar feature as illustrated in FIGS. 6A-6D. Helmet 3900 includes an outer shell 3905 and an inner layer 3910, which may include a low friction layer (e.g., a MIPS™ layer). In the embodiment shown, sweat removal apparatus 3915 is configured to form an inwardly curved shape with a descending or sloped wall and a catch region where one or more liquids can be channeled, directed, and/or captured in a manner similar to channels 106a-106d/206a-206d as described above. For example, as illustrated, some embodiments of sweat removal apparatus 3915 can include a J shape in cross section with a first predominantly or generally vertical side 3916 in contact or adjacent to the inner layer 3910, and a second predominantly or generally vertical leg 3917 configured to be in contact with or adjacent to the wearer's head with a channel 3918 between the first leg 3916 and the second leg 3917. In some embodiments, as illustrated, the first leg 3916 can be longer than the second leg 3917.

The helmet 3900 can include a fit system comprising a mechanical reel 3922 that changes the length of a lace 3921. Any suitable fit system may be used including a reel and lace system, a ratchet system, a non-cable system that uses flexible pieces to tighten an internal headband, and the like. Examples of reel-based closure systems are provided in U.S. Pat. No. 7,954,204, entitled "Reel Based Closure System," issued Jun. 7, 2011, the entire contents of which are incorporated herein by reference for all purposes, including the discussion of fit systems above. The lace 3921 includes a portion 3923 that lies within the channel 3918 of the sweat removal apparatus 3915. When the mechanical reel 3922 cinches the lace 3921, it applies an inward force that causes the shorter or inner leg 3917 of the sweat removal apparatus 3915 to remain in contact with the head of the wearer while also causing the channel of the sweat removal apparatus 3915 to remain open to receive and to direct liquid (e.g., sweat) away from the wearer's face. In some embodiments, the outer or first leg 3916 is attached to the inner layer 3910 and/or the shell 3905 so that when the force is applied on the second leg 3917, the channel remains open due at least in part to the first leg 3916 being attached to the helmet 3900. In some embodiments, the sweat removal apparatus 3915 is attached to the inner layer 3905. In some embodiments, the sweat removal apparatus is attached to a MIPS layer, if provided. For example, in some embodiments, the sweat removal apparatus 3915 can be configured to include flexible hooks 3914 extending from the first leg 3916 or other mechanical fasteners and the inner layer 3905 can be configured to include corresponding openings 3907 or corresponding engagement portions in the inner layer 3905, where the hooks 3914 can be inserted (not shown as inserted) through the openings 3907 to connect the sweat removal apparatus 3915 to the inner layer 3905. In some embodiments, the sweat removal apparatus 3915 can be attached to the portion 923 of the lace 921 using features 3919. In some embodiments, a periphery 3908 of the inner layer 3905 sits within the channel 3918 of the sweat removal apparatus 3915. This can aid in keeping the channel 3918 open. In certain embodiments, the sweat removal apparatus 3915 may be a modular feature that can be added and removed from a helmet system, such as by using a hook-and-loop fastener, snaps, clamps, etc. In some embodiments, the sweat removal apparatus 3915 is integrated into or permanently attached to the helmet fit system. In some other embodiments, the sweat removal apparatus 3915 is integrated with the helmet 3900, the shell 3910, and/or the inner layer 3905.

As described with respect to sweat removal apparatuses 100, 150, and 200, the sweat removal apparatus 3915 can be made of any suitable material that is flexible and impermeable, such as silicone, a rubberized material, soft plastic, or a closed-cell foam. The material can be configured to conform to a surface, such as a forehead of a wearer, and may create a seal against the forehead of the wearer. The sweat removal apparatus 3915 can be configured to direct the liquid to different parts of the wearer's head. For example, the sweat removal apparatus 3915 can direct liquid behind the ears of the wearer, in front of the ears, just behind the eyes of the wearer, or at the back of the head of the wearer.

The shell 3905 or inner layer 3910 can include one or more features that enhance sweat collection in the sweat removal apparatus 3915. For example, the shell 3905 and/or inner layer 3910 can include a jog 3906 above the sweat removal apparatus 3915. As liquid flows down the interior of the shell 3905 and/or inner layer 3910, it drops from the jog 3906 into the sweat removal apparatus 3915. Similarly, the inner layer 3910 can include features that facilitate sweat collection in the sweat removal apparatus 3915. For example, the inner layer can include openings 3911 that allow sweat to drip into the sweat removal apparatus and/or break out moisture in the helmet 3900 so that it collects in the sweat removal apparatus 3915.

In some embodiments, the sweat removal apparatus 3915 can be configured to allow movement between the shell 3905 and the inner layer 3910. The sweat removal apparatus 3915 can be configured to be spaced from the jog 3906 to allow the shell 3905 to move relative to the inner layer 3910 without impeding the movement up to the distance between the jog 3906 and the first leg 3916 of the sweat removal apparatus 3915.

Figure 7A:
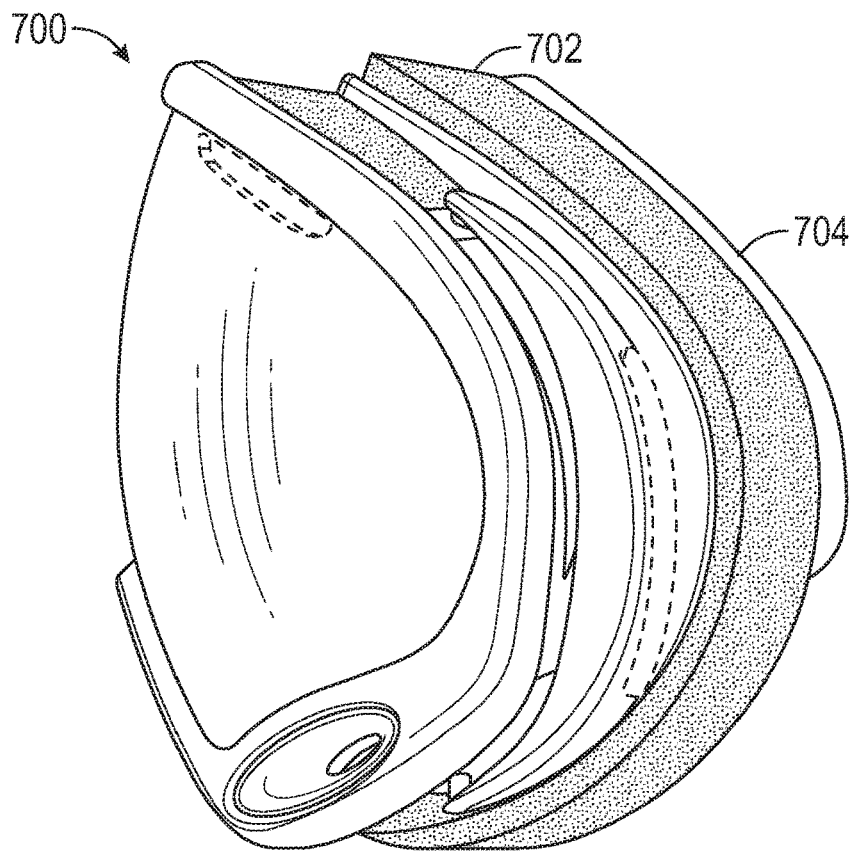
FIGS. 7A-7B illustrate an example sweat removal apparatus installed in a goggle.
Figure 7B:
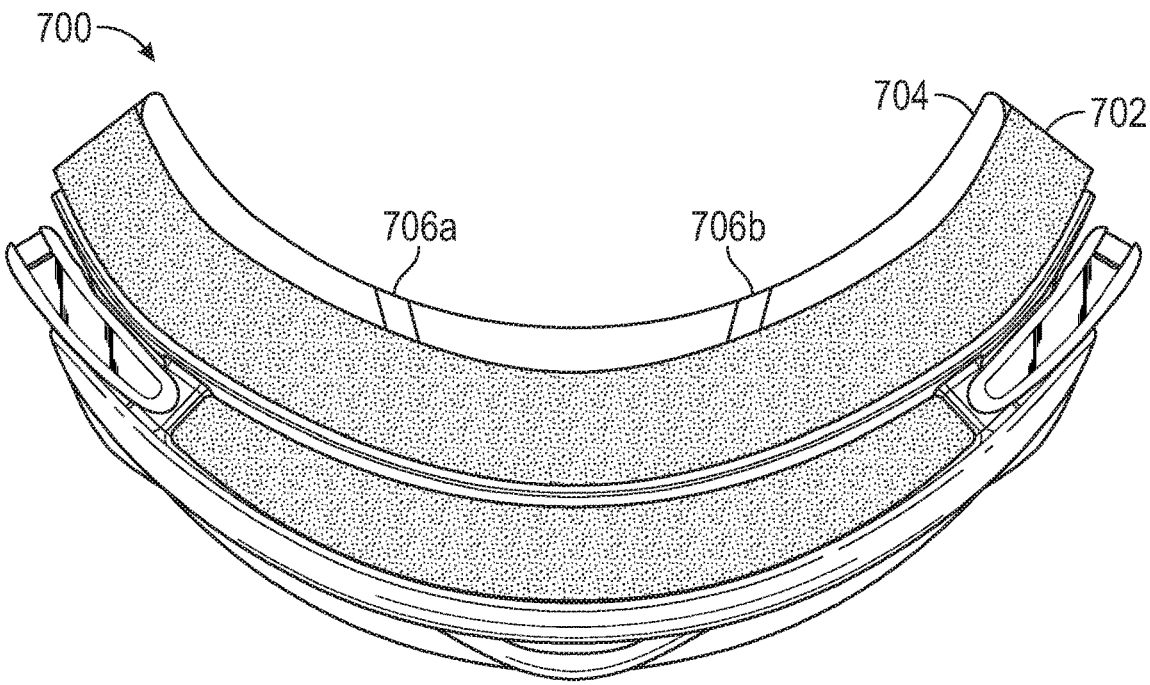

In some embodiments, a sweat removal apparatus may be attached to a snow goggle, a motocross (MX) goggle, or other type of goggle. FIGS. 7A-7B depict an example showing a snow goggle 700 with a sweat removal apparatus 704 attached, with FIG. 7A being a side view and FIG. 7B being a top view. In some embodiments, the sweat removal apparatus can replace conventional goggle face foam along the area where the goggle contacts the eyebrow or forehead of the wearer. In some embodiments and as depicted in FIGS. 7A-7B, the sweat removal apparatus is attached to an underlying layer of face foam 702 of the goggle 700, where the sweat removal apparatus 704 forms the outer contacting surface. In some embodiments, the sweat removal apparatus is integrally formed with the face foam as a unitary, one-piece structure (e.g., by casting or 3D printing). In the top view shown in FIG. 7B, placement of cross channels 706a-706b is shown (corresponding to 152a-152b in FIG. 1C). It is to be appreciated that the sweat removal apparatus 704 may be, for example, an embodiment of the sweat removal apparatus described above, such as apparatus 100, 150, 200, or an apparatus having similar features.

EXAMPLE EMBODIMENTS

Example embodiments of the present invention may include the following features, alone or in combination as noted:

(1) A sweat removal apparatus, comprising an elongate base member having a front surface and a back surface opposite the front surface; and a plurality of pliable ridges abutting the back surface of the elongate base member and protruding outwardly therefrom, the plurality of pliable ridges extending along a length of the back surface of the elongate base member and configured to form channels when pressed against a wearer's head, each channel having openings located at a distance past a wearer's eyes.

(2) A sweat removal apparatus, comprising an elongate base member having a front surface and a back surface opposite the front surface; and a plurality of pliable ridges abutting the back surface of the elongate base member and protruding outwardly therefrom, the plurality of pliable ridges extending along a length of the back surface of the elongate base member and configured to form channels when pressed against a wearer's head, each channel having openings located at a position between a wearer's eyes.

(3) The sweat removal apparatus of embodiments 1 or 2, wherein the elongate base member and the plurality of pliable ridges together form a monolithic apparatus.

(4) The sweat removal apparatus of any of the preceding embodiments, wherein plurality of the pliable ridges are configured to conform to a shape of the wearer's head when pressed against the wearer's head.

(5) The sweat removal apparatus of any of the preceding embodiments, wherein the elongate base member and the plurality of pliable ridges comprise a non-absorbent material.

(6) The sweat removal apparatus of any of the preceding embodiments, wherein the plurality of pliable ridges are more pliable than the elongate base member.

(7) The sweat removal apparatus of any of the preceding embodiments, wherein each ridge in the plurality of pliable ridges protrudes outwardly at an acute angle between the back surface of the elongate base member and a top surface of the ridge.

(8) The sweat removal apparatus of any of the preceding embodiments, wherein the front surface of the elongate base member is shaped for insertion into an item of headwear.

(9) The sweat removal apparatus of any of the preceding embodiments, further comprising a removable fastening mechanism on the front surface of the elongate base member, configured to removably attach the sweat removal apparatus to an item of headwear.

(10) The sweat removal apparatus of any of embodiments 1-8, further comprising a permanent fastening mechanism on the front surface of the elongate base member, configured to permanently attach the sweat removal apparatus to an item of headwear.

(11) The sweat removal apparatus of any of the preceding embodiments, wherein the plurality of pliable ridges includes a hydrophobic coating.

(12) The sweat removal apparatus of any of embodiments 1-10, wherein the plurality of pliable ridges includes a hydrophilic coating.

(13) The sweat removal apparatus of any of the preceding embodiments, wherein the elongate base member has a central region and two end regions, further comprising two cross channels, each cross channel extending across at least one of the plurality of pliable ridges at an angle away from a top edge of the elongate base member and in a direction from the central region toward a respective end region.

(14) The sweat removal apparatus of any of the preceding embodiments, further comprising a protrusion located along the top edge of the elongate base member above the central region.

(15) The sweat removal apparatus of embodiment 14, the protrusion comprising a pliable ridge at or near a perimeter of the protrusion.

(16) The sweat removal apparatus of embodiment 14 or 15, wherein the elongate base member, the protrusion, and the plurality of pliable ridges together form a monolithic apparatus.

(17) The sweat removal apparatus of any of embodiments 14-16, wherein the elongate base member comprises a non-absorbent material.

(18) The sweat removal apparatus of any of the preceding embodiments, wherein the plurality of pliable ridges are configured to form channels along the central portion of the elongate base member when pressed against a wearer's head, each channel along the central portion bounded at each end of the channel by a respective cross channel.

(19) An item of headwear comprising the sweat removal apparatus of any of the preceding embodiments.

(20) The item of headwear of embodiment 19, wherein the item of headwear is a bicycle helmet, a skateboarding helmet, eye protection, eyewear, headband, or any other item that a person would wear on the head or eyes.

(21) The item of headwear of either of embodiments 19 or 20, further comprising a fit system, wherein the fit system incorporates the sweat removal apparatus of any of embodiments 1-18.

(22) The item of headwear of embodiment 21, wherein the sweat removal apparatus of any of embodiments 1-18 is either attached to or integrated into the fit system.

(23) A helmet comprising a base portion comprising a shell and an inner layer coupled to the shell, the base portion configured to absorb or distribute force from an impact; a sweat removal apparatus coupled to the base portion and comprising an outer leg, an inner leg shorter than the outer leg, and a channel between the outer leg and the inner leg, the sweat removal apparatus configured to direct liquid away from a face of the wearer; and a fit system comprising a flexible elongate structure having a portion that is positioned within the sweat removal apparatus, the fit system, in use, configured to: secure the base portion to a head of a wearer by adjusting the flexible elongate structure; and pull at least a portion of the inner leg of the internal collection device against the head of the wearer.

(24) The helmet of embodiment 23, wherein the sweat removal apparatus comprises a deformable material.

(25) The helmet of any of embodiments 23-24, wherein the fit system comprises a reel that is configured to adjust the length of the flexible elongate structure.

(26) The helmet of any of embodiments 23-25, wherein the base portion comprises a jog positioned above the sweat removal apparatus so that, in use, liquid drips from the jog into the sweat removal apparatus.

(27) The helmet of any of embodiments 23-26, wherein the sweat removal apparatus comprises a deformable structure that forms a channel configured to direct liquid away from a face of the wearer.

(28) The helmet of any of embodiments 23-27, wherein the sweat removal apparatus is removable from the helmet.

(29) The helmet of any of embodiments 23-28, wherein the sweat removal apparatus is configured to attach to the inner layer.

(30) The helmet of embodiment 29, wherein the inner layer comprises a low friction layer configured to translate or rotate with respect to the shell.

(31) An apparatus comprising: a helmet; a fit system coupled to an inside of the helmet; and a sweat removal apparatus removably attached to the fit system, the sweat removal apparatus comprising: an elongate base member having a front surface and a back surface opposite the front surface; a plurality of pliable ridges abutting the back surface of the elongate base member and protruding outwardly therefrom, the plurality of pliable ridges extending along a length of the back surface of the elongate base member and configured to form channels when pressed against a wearer's head, each channel having openings located at a distance past a wearer's eyes when worn; and a fastening mechanism attached to the front surface of the elongate base member and configured to removably attach the sweat removal apparatus to the fit system.

(32) The apparatus of embodiment 29, wherein the fastening mechanism comprises a hook-and-loop fastener.

(33) The apparatus of embodiment 29, wherein the fastening mechanism comprises a magnetic coupling system.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance provided herein.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

It is to be appreciated that the Detailed Description section, and not the Abstract section, is intended to be used to interpret the following claims. The Abstract section may set forth one or more, but not all exemplary embodiments, of the disclosure, and thus, are not intended to limit the disclosure and the appended claims in any way.

What is claimed is:

1. An apparatus for use on a wearers head, comprising:
    a helmet;
    a sweat removal apparatus attached to an inner contacting surface of the helmet, comprising:
    an elongate base member comprising a first material and having a front surface and a back surface opposite the front surface; and
    a plurality of pliable ridges comprising a second material and abutting the back surface of the elongate base member and protruding outwardly therefrom, the plurality of pliable ridges extending along a length of the back surface of the elongate base member and configured to form channels when pressed against the wearer's head, each channel having openings located at a distance past the wearers eyes when worn,
    wherein the front surface of the elongate base member is shaped for attachment to the inner contacting surface of the helmet,
    wherein each ridge in the plurality of pliable ridges protrudes outwardly at an acute angle between the back surface of the elongate base member and a top surface of the ridge, and
    wherein a durometer rating of the first material is more than a durometer rating of the second material such that the plurality of pliable ridges are more pliable than the elongate base member.

2. The apparatus of claim 1, wherein the elongate base member and the plurality of pliable ridges together form a monolithic apparatus.

3. The apparatus of claim 1, wherein the plurality of pliable ridges are configured to conform to a shape of the wearer's head when pressed against the wearer's head.

4. The apparatus of claim 1, wherein the elongate base member and the plurality of pliable ridges comprise a non-absorbent material.

5. The apparatus of claim 1, wherein the front surface of the elongate base member is attached to the inner contacting surface of the helmet such that the back surface of the elongate base member forms a contacting surface between the wearer's head and the helmet.

6. The apparatus of claim 1, further comprising a removable fastening mechanism on the front surface of the elongate base member, configured to removably attach the sweat removal apparatus to the helmet.

7. The apparatus of claim 1, wherein the plurality of pliable ridges includes a hydrophobic coating or a hydrophilic coating.

8. The apparatus of claim 1, further comprising:
    at least one cross channel having a top opening at a first distance away from a central region of the elongate base member and a bottom opening at a second distance away from the central region of the elongate base member, the second distance being greater than the first distance, and wherein each cross channel extends across at least one of the plurality of pliable ridges.

9. The apparatus of claim 1, further comprising:
    a fit system configured to adjust a size of the helmet based on a head size of the wearer of the helmet.

10. The apparatus of claim 9, wherein the back surface of the elongate base member forms a contacting surface of the fit system with the wearer's head.

11. An apparatus for use on a wearer's head comprising:
    a helmet;

a fit system coupled to an inside of the helmet, the fit system configured to adjust a size of the helmet based on head size of the wearer; and a sweat removal apparatus removably attached to the fit system and configured to form a head contacting surface of the fit system for diversion of sweat from the wearer when worn, the sweat removal apparatus comprising:

an elongate base member having a front surface and a back surface opposite the front surface;

a plurality of pliable ridges abutting the back surface of the elongate base member and protruding outwardly therefrom such that a surface of a first pliable ridge, a surface of a second pliable ridge, and the back surface of the elongate base member form a u shape, the plurality of pliable ridges extending along a length of the back surface of the elongate base member and configured to form channels when pressed against the wearer's head, each channel extending from one end region to another end region through a central region and having openings located in the two end regions at a distance past the wearer's eyes when worn; and a fastening mechanism attached to the front surface of the elongate base member and configured to removably attach the sweat removal apparatus to the fit system, wherein each of the channels is formed from the back surface of the elongate base member, a surface of one of the plurality of pliable ridges, and a surface of a forehead of the wearer when worn.

12. The apparatus of claim 11, wherein the fastening mechanism comprises a hook-and-loop fastener.

13. The apparatus of claim 1, wherein the elongate base member further comprises a top edge extending between the front surface and the back surface and a bottom edge extending between the front surface and the back surface, and wherein a height of the elongate base member measured between the top edge and the bottom edge is approximately 9 millimeters.

14. The apparatus of claim 1, wherein a height direction is defined as the direction between a top edge extending between the front surface and the back surface and a bottom edge extending between the front surface and the back surface, wherein each pliable ridge of the plurality of pliable ridges is thicker in the height direction at a first portion of the pliable ridge closer to the elongate base member than at a second portion of the pliable ridge farther away from the elongate base member.

15. An apparatus for use on a wearer's head, comprising:
a helmet;

a fit system coupled to an inside of the helmet, the fit system configured to adjust a size of the helmet based on head size of the wearer; and a sweat removal apparatus removably attached to the fit system and configured to form a head contacting surface of the fit system for diversion of sweat from the wearer when worn, the sweat removal apparatus comprising:

an elongate base member having a front surface and a back surface opposite the front surface;

a plurality of pliable ridges abutting the back surface of the elongate base member and protruding outwardly therefrom, the plurality of pliable ridges extending along a length of the back surface of the elongate base member and configured to form channels when pressed against the wearer's head, each channel extending from one end region to another end region through a central region and having openings located in the two end regions at a distance past the wearer's eyes when worn; and a fastening mechanism attached to the front surface of the elongate base member and configured to removably attach the sweat removal apparatus to the fit system, wherein each of the channels is formed from the back surface of the elongate base member, a surface of one of the plurality of pliable ridges, and a surface of a forehead of the wearer when worn, and wherein a portion of the back surface is disposed between a first pliable ridge and a second pliable ridge of the plurality of pliable ridges, the portion of the back surface extending between the first and second pliable ridges such that an acute angle is formed between the portion of the back surface and an adjacent surface of one of the first and second pliable ridges, and an obtuse angle is formed between the portion of the back surface and an adjacent surface of the other of the first and second pliable ridges.

16. The apparatus of claim 15, wherein the elongate base member further comprises a top edge extending between the front surface and the back surface and a bottom edge extending between the front surface and the back surface, and wherein a height of the elongate base member measured between the top edge and the bottom edge is approximately 9 millimeters.

17. The sweat removal apparatus of claim 15, wherein the plurality of pliable ridges includes a hydrophobic coating or a hydrophilic coating.

* * * * *